(12) United States Patent
de Bock et al.

(10) Patent No.: US 11,923,569 B2
(45) Date of Patent: Mar. 5, 2024

(54) HIGH PERFORMANCE FUEL CELLS

(71) Applicant: General Electric Company, Schenectady, NY (US)

(72) Inventors: Hendrik Pieter Jacobus de Bock, Clifton Park, NY (US); Richard L. Hart, Broadalbin, NY (US); Honggang Wang, Clifton Park, NY (US); Narendra D. Joshi, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 17/240,228

(22) Filed: Apr. 26, 2021

(65) Prior Publication Data

US 2022/0344678 A1 Oct. 27, 2022

(51) Int. Cl.
*H01M 8/0258* (2016.01)
*H01M 8/0263* (2016.01)

(52) U.S. Cl.
CPC ....... *H01M 8/0258* (2013.01); *H01M 8/0263* (2013.01); *H01M 2250/20* (2013.01)

(58) Field of Classification Search
CPC ............. H01M 8/0258; H01M 8/0263; H01M 2250/20
See application file for complete search history.

(56) References Cited

U.S. PATENT DOCUMENTS

| | | | |
|---|---|---|---|
| 5,227,256 A | 7/1993 | Marianowski et al. | |
| 7,090,942 B2 | 8/2006 | Bunker | |
| 7,743,499 B2 | 6/2010 | Pettit et al. | |
| 8,268,510 B2 | 9/2012 | Rock et al. | |
| 8,524,412 B2 | 9/2013 | Rock et al. | |
| 9,005,847 B2 | 4/2015 | Rock et al. | |
| 9,444,108 B2 | 9/2016 | Brousseau | |
| 2004/0028988 A1 | 2/2004 | Bunker | |

(Continued)

FOREIGN PATENT DOCUMENTS

| | | |
|---|---|---|
| DE | 102009058512 B4 | 4/2017 |
| EP | 3336948 B1 | 9/2019 |
| WO | 2018108962 A1 | 6/2018 |

OTHER PUBLICATIONS

Cocker, "3D printing cuts fuel cell component costs," Chemistry World, accessed at <https://www.chemistryworld.com/news/3d-printing-cuts-fuel-cell-component-costs/7526.article>, Published Jul. 3, 2014.

*Primary Examiner* — Brittany L Raymond
(74) *Attorney, Agent, or Firm* — Dority & Manning, P.A.

(57) ABSTRACT

A fuel cell unit that includes a support structure having a plurality of flow channels and an active layer membrane coupled with the support structure, the active layer membrane comprising at least one electrode layer. Each flow channel of the plurality of flow channels is configured to direct one of air and fuel across at least one electrode layer of an active layer membrane to create electric current. Each flow channel of the plurality of flow channels includes at least one enhancement feature that is configured to disrupt a formation of a boundary layer near a surface of the active layer membrane where reactions occur. The plurality of flow channels can be positioned in a zig-zag configuration to allow for an increase in power density of the fuel cell unit.

18 Claims, 9 Drawing Sheets

(56) References Cited

U.S. PATENT DOCUMENTS

| | | | |
|---|---|---|---|
| 2004/0053094 A1* | 3/2004 | Bunker | H01M 8/1007 |
| | | | 429/434 |
| 2006/0091256 A1* | 5/2006 | Palmer | B64B 1/30 |
| | | | 244/97 |
| 2017/0110740 A1* | 4/2017 | Gurney | H01M 8/04014 |
| 2017/0314143 A1* | 11/2017 | Emerick | C25B 1/02 |
| 2018/0047996 A1* | 2/2018 | Ito | C22C 14/00 |

* cited by examiner

HIGH PERFORMANCE FUEL CELLS

TECHNICAL FIELD

The present disclosure relates to high performance fuel cells and combustion systems including such fuel cells. In particular, the present disclosure relates to a fuel cell unit including flow channels that each include enhancement feature(s) configured to disrupt a formation of a boundary layer near a surface of the active layer membrane where reactions occur. The present disclosure further relates to a fuel cell unit including flow channels that alternate in a zig-zag or see-saw configuration and thereby provide an increase in a power density of the fuel cell unit.

BACKGROUND

Fuel cells are electrochemical energy conversion devices that have demonstrated a potential for relatively high efficiency and low pollution in power generation. A fuel cell generally provides a direct current (dc) which may be converted to alternating current (ac) via, for example, an inverter. The dc or ac voltage can be used to power motors, lights, communication equipment and any number of electrical devices and systems. Fuel cells may operate in stationary, semi-stationary, or portable applications. Certain fuel cells, such as solid oxide fuel cells (SOFCs), may operate in large-scale power systems that provide electricity to satisfy industrial and municipal needs. Others may be useful for smaller portable applications such as, for example, powering cars.

A fuel cell produces electricity by electrochemically combining a fuel and an oxidant across an ionic conducting layer. This ionic conducting layer, also referred to as the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents. In general, components of a fuel cell include the electrolyte and two electrodes. The reactions that produce electricity generally take place at the electrodes where a catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

BRIEF SUMMARY

According to an embodiment, a fuel cell unit is provided that comprises a support structure having a plurality of flow channels, and an active layer membrane coupled with the support structure, the active layer membrane comprising at least one electrode layer. Each flow channel of the plurality of flow channels is configured to direct one of air and fuel across at least one electrode layer of an active layer membrane to create electric current, and each flow channel of the plurality of flow channels includes at least one enhancement feature that is configured to disrupt a formation of a boundary layer near a surface of the active layer membrane where reactions occur.

According to an embodiment, a fuel cell comprising a plurality of fuel cell units is provided. Each fuel cell unit of the plurality of fuel cell units comprises a support structure having a plurality of flow channels, and an active layer membrane coupled with the support structure, the active layer membrane comprising at least one electrode layer. Each flow channel of the plurality of flow channels is configured to direct one of air and fuel across at least one electrode layer of an active layer membrane to create electric current, and each flow channel of the plurality of flow channels includes at least one enhancement feature that is configured to disrupt a formation of a boundary layer near a surface of the active layer membrane where reactions occur.

According to an embodiment, a method is provided that comprises directing fuel into fuel inlets of fuel cells in a fuel cell stack that extends from an inlet end to a combustion outlet end, the fuel inlets located proximate to the inlet end of the fuel cell stack; directing air into air inlets of the fuel cells, the air inlets located proximate to the inlet end of the fuel cell stack; creating electric energy by directing the air and the fuel across opposite sides of an active layer membrane that includes an anode layer, an electrolyte layer, and a cathode layer; directing at least some of the fuel and at least some of the air through flow channels of the fuel cells toward combustion outlets of the fuel cells that are proximate to the combustion outlet end of the fuel cell stack; and combusting the at least some fuel and the at least some air proximate the combustion outlet ends as an output combustion from the fuel cells.

Additional features, advantages, and embodiments of the disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

A need exists for improved fuel cell performance. More particularly there remains a need for a fuel cell with improved performance and power density. Accordingly, the present disclosure relates to high performance fuel cells and combustion systems including such fuel cells. According to embodiments of the present disclosure, through the use of additive enabled flow boundary layer disruption and pressurization geometry in accordance with the principles of the disclosure, a high performance fuel cell can be provided. For example, fuel cell performance can be limited due to conventional manufacturing and/or boundary layers forming near the surface of the electrode(s) and/or membrane(s) where reactions occur. The fuel cells in accordance with the principles of the disclosure provide improved performance and power density with an optimized design and/or features that swirl or disrupt the formation of boundary layers. In accordance with the principles of the disclosure, the size, volume, and/or weight of the fuel cell can be reduced, which allows for a more compact structure, as well as a reduced cost. With a more compact structure and/or smaller volume, the fuel cell can fit on a jet engine (e.g., a gas turbine engine), for example, and may reduce emissions by at least 70%, with potential lower heating value (LHV) efficiencies exceeding at least 58%.

In one aspect, a fuel cell unit can include flow channels comprising enhancement feature(s) to disrupt a formation of a boundary layer near a surface of the active layer membrane where reactions occur.

A fuel cell unit can include a support structure with flow channels and an active layer membrane including an electrode layer. The flow channels direct air and/or fuel across the electrode layer of the active layer membrane to create electric current. The flow channels can include enhancement feature(s) to disrupt a formation of a boundary layer near a surface of the active layer membrane where reactions occur.

Figure 1:
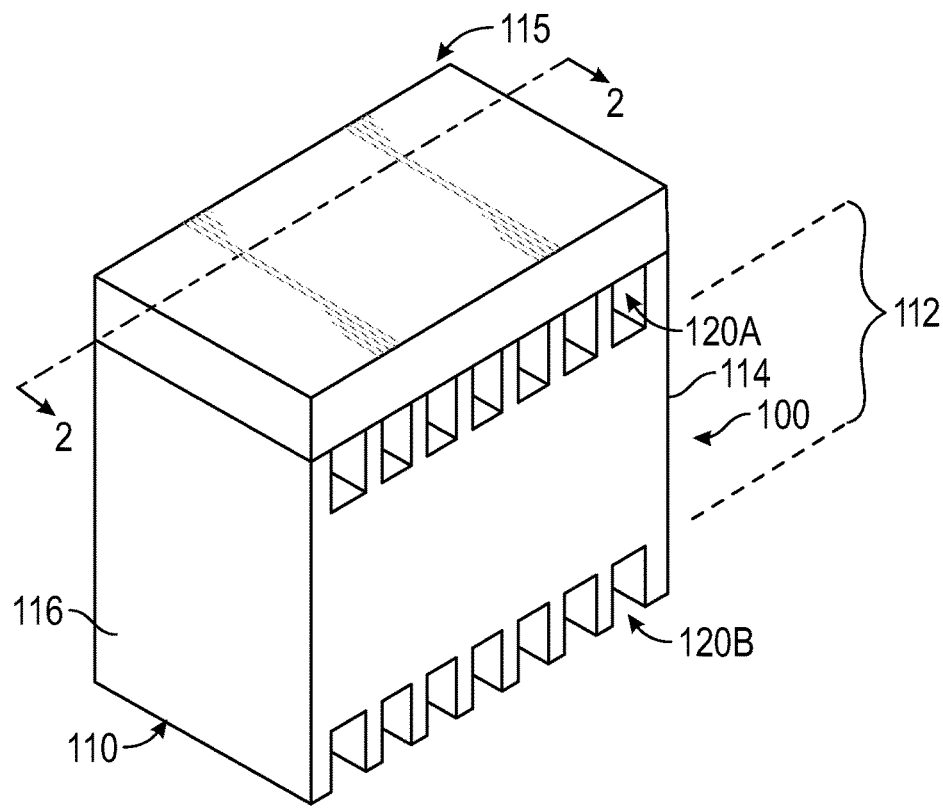
FIG. 1 illustrates a perspective view of a fuel cell unit according to an embodiment of the present disclosure.
Figure 2:
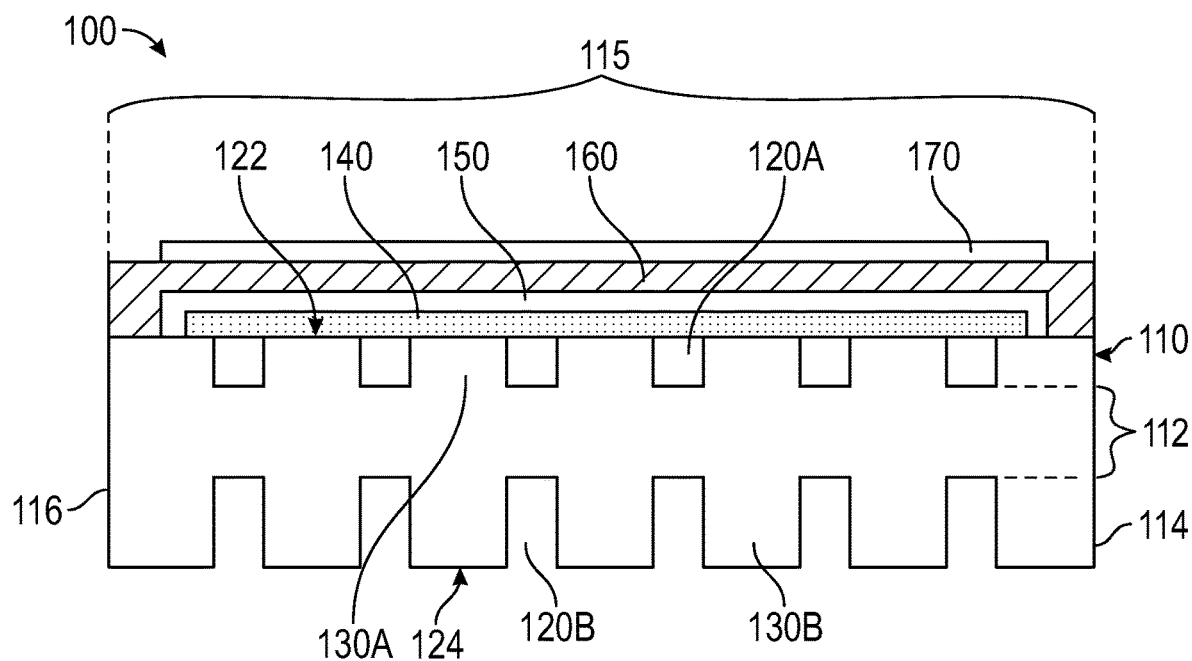
FIG. 2 illustrates a cross-sectional side view of the fuel cell unit of FIG. 1, taken along line 2-2 shown in FIG. 1.

FIGS. 1 and 2 illustrate a fuel cell unit 100 according to an embodiment of the disclosure. As shown in FIGS. 1 and 2, the fuel cell unit 100 includes a support structure 110 that extends from a first side 114 to a second side 116, with the support structure 110 having a plurality of elongated flow channels or passages shown as flow channels 120A, 120B. According to one embodiment, the support structure 110 comprises a metal support and/or a ceramic support that provides conduction of electric current between fuel cells in a stack (see, e.g., FIG. 3). This support structure 110 can also be referred to as a conductive support structure.

According to one embodiment, the support structure 110 includes a solid plate 112 with protrusions 130A, 130B extending away from the solid plate 112 in opposite directions (e.g., toward side/surface 122 of the fuel cell unit 100 having an active layer membrane 115 (which will be described in further detail below) and toward the opposite side/surface 124 (or open side 124 as this side is not bounded or enclosed by any active layer membrane (e.g., active layer membrane 115)) of the fuel cell unit 100). The protrusions 130A, 130B extend the length of the plate 112, and thus, the protrusions are elongated in the same direction that each of the flow channels 120A, 120B extends. These protrusions 130A, 130B and the plate 112 form the plurality of flow channels 120A, 120B, as shown, that are elongated and internal to the support structure 110. For example, the plurality of flow channels 120A, 120B extend into the interior of the body of the support structure 110. The plurality of flow channels 120A, 120B can be less than one millimeter tall (e.g., the direction that the plurality of flow channels 120A, 120B extend into the support structure 110), such as, e.g., twenty-five mils (0.635 millimeters) tall. The plurality of flow channels 120A, 120B can be around three millimeters wide, such as, e.g., 3.176 millimeters wide. Alternatively, the plurality of flow channels 120A, 120B can be taller or shorter, wider or narrower.

In each fuel cell unit 100, the flow channels 120A on one side of the plate 112 (e.g., side 122) can be fuel channels or passages through which fuel flows through the fuel cell unit 100 and the flow channels 120B on the opposite side of the plate 112 (e.g., side 124) can be air channels or passages through which air flows through the fuel cell unit 100. Alternatively, the flow channels 120A on one side of the plate 112 (e.g., side 122) can be air channels or passages through which air flows through the fuel cell unit 100 and the flow channels 120B on the opposite side of the plate 112 (e.g., side 124) can be fuel channels or passages through which fuel flows through the fuel cell unit 100.

The flow channels 120A are each bounded or enclosed by the active layer membrane 115 (which will be described in further detail below), two of the protrusions 130A, and the plate 112. These flow channels 120A can be referred to as closed channels or passages. In contrast, the flow channels 120B can be referred to as open channels or passages as these flow channels 120B are bounded on three sides by the plate 112 and the protrusions 130B, but they are not bounded or enclosed by any active layer membrane (e.g., active layer membrane 115) and thus, the flow channels 120B are open along the side 124 of the support structure 110.

The support structure 110 of FIGS. 1 and 2 can be relatively small in size. For example, the support structure 110 can have a length (e.g., the dimension running from the front to the back of the fuel cell, in the perspective of FIG. 1) that is, for example, eight centimeters (800 mm) long. The support structure 110 can have a width (e.g., the dimension running horizontally, or left to right, in the perspective of FIG. 1) that is, for example, 2.5 centimeters (250 mm) long. The support structure 110 can further have a thickness (e.g., the dimension running vertically, or top to bottom, in the perspective of FIG. 1) that is, for example, 2.2 mm long. The active layer membrane 115 (which will be described in further detail below) can have a footprint, or extend over a surface area, that is, for example, ten square centimeters. Alternatively, the length and/or width of the support structure 110 and/or the size of the active layer membrane 115 can be smaller or larger than these dimensions. While the support structure 110 is shown as a planar plate, optionally, the support structure 110 can have a non-planar shape. For example, the support structure 110 can be formed as a curved plate around a center axis of an aircraft engine. Optionally, the support structure 110 can have another shape. While other components of the fuel cell unit 100 are shown as planar bodies or plates, optionally, these other components also can have a non-planar shape like the support structure 110.

The fuel cell unit 100 of FIGS. 1 and 2 further includes an active layer membrane 115. According to one embodiment, the active layer membrane 115 can comprise a plurality of layers. For example, as shown in the embodiment of FIG. 2, the active layer membrane 115 can be provided on and separated from the support structure 110 by a porous support layer 140. The porous support layer 140 can be formed from one or more materials that form pores to allow fuel and air to flow through the porous support layer 140. In one embodiment, the support structure 110 and the porous support layer 140 can each be formed from the same type of material(s). Alternatively, according to an embodiment, the support structure 110 may be formed to be non-porous (e.g., fluids cannot pass through the support structure 110), while the porous support layer 140 can be formed to include pores through which one or more fluids can pass through the porous support layer 140. Examples of materials that can be used to create the support structure 110 and/or the porous support layer 140 include, for example, conducting ceramic materials (e.g., for the porous support layer 140, foams made of ceramic-metal hybrid materials), metals, metal alloys, etc. The porous support layer 140 can be formed by, e.g., thermally spraying the material(s) used to form the porous support layer 140 on the support structure 110, by forming a foam as the porous support layer 140 on the support structure 110 while brazing the support structure 110 (and optionally adding a sintering aid to the foam), by additively manufacturing the porous support layer 140 on the support structure 110, by casting the porous support layer 140 using a slurry, by heat treating the foam forming the porous support layer 140 in an inert gas environment, by using a metal structure like a grid or mesh, etc. In all cases, for example, the porous support layer 140 is bonded to the support structure 110 in some manner.

The active layer membrane 115 of FIG. 2 further includes an anode layer 150 that is deposited or otherwise formed on the porous support layer 140. The anode layer 150 is generally formed from materials that operate as an anode of a fuel cell formed by a combination of two of the fuel cell units 100. The active layer membrane 115 also includes an electrolyte layer 160 deposited or otherwise formed on the anode layer 150. The electrolyte layer 160 is generally formed from materials that operate as the electrolyte of a fuel cell (e.g., solid oxide fuel cell (SOFC)) formed by a combination of two of the fuel cell units 100. The active layer membrane 115 also includes a cathode layer 170 deposited or otherwise formed on the electrolyte layer 160. The cathode layer 170 is generally formed from materials that operate as the cathode of a fuel cell formed by a combination of two of the fuel cell units 100. Alternatively, the cathode layer 170 may be on and in contact with the porous support layer 140 instead of the anode layer 150 with the anode layer 150 in the location of the cathode layer 170 shown in FIG. 2. The two-dimensional region or footprint of layers, including, for example, the anode layer 150, the electrolyte layer 160, and the cathode layer 170, with or without the porous support layer 140, that overlap each other, in whole or in part, defines the active layer membrane 115 of the fuel cell unit 100.

According to one embodiment, the electrodes (e.g., anode layer 150, electrolyte layer 160, and/or cathode layer 170 of FIG. 2) of the fuel cell unit 100 can be deposited on the porous support (e.g., porous support layer 140 of FIG. 2), such as, e.g., by depositing the anode layer 150 on the porous support layer 140, the electrolyte layer 160 on the anode layer 150, and the cathode layer 170 on the electrolyte layer 160. The porous support layer 140 may have pores that are large enough to allow fuel (e.g., gaseous fuel) flowing in the flow channels 120A to diffuse through the porous support layer 140 to the electrodes (e.g., anode layer 150, electrolyte layer 160, and/or cathode layer 170 of FIG. 2). But, the pores may be small enough to stop passage of any particles forming the electrodes (e.g., anode layer 150, electrolyte layer 160, and/or cathode layer 170 of FIG. 2) from passing through the porous support layer 140. In one embodiment, the pores in the porous support layer 140 can range in size from two micrometers to eighty micrometers, but alternatively, may be smaller or larger depending on the size of the particles that are deposited to form the electrodes (e.g., anode layer 150, electrolyte layer 160, and/or cathode layer 170 of FIG. 2). The layers of material forming the electrodes (e.g., anode layer 150, electrolyte layer 160, and/or cathode layer 170 of FIG. 2) can be deposited using thermal spraying or another deposition technique.

The fuel cell unit 100 may be relatively thin. For example, the support structure 110 may be around, for example, 2.2 millimeters thick. According to one embodiment, the support structure 110 may be within 3% of 2.2 millimeters. The active layer membrane 115 can be around, for example, two hundred microns thick. According to one embodiment, the active layer membrane 115 may be within 3% of two hundred microns. The cathode layer 170 can be, for example, fifty to one hundred microns thick, the electrolyte layer 160 can be, for example, five to thirty microns thick, and the anode layer 150 can be, for example, fifty to one hundred microns thick. Alternatively, one or more of these layers can be thicker or thinner than these example dimensions.

The support structure 110 (e.g., conductive support structure) and the electrodes (e.g., anode layer 150, electrolyte layer 160, and/or cathode layer 170 of FIG. 2) in the fuel cell unit 100 can be formed from one or more corrosion resistant metals to slow degradation of the fuel cell unit 100 (relative to using non-corrosion resistant metals). Examples of the metals that can be used include, but are not limited to, E-BRITE®, stainless steel of the SS430 series (e.g., SS430, SS431, etc.), JETHETE M152™, CROFER 22 APU, and HAYNES® alloys, nickel and nickel chromium alloys, or the like. The metal may have a large chrome content (e.g., higher than, for example, 8-10% by weight of the metal support structure 110 and/or the porous support layer 140) to impart greater conductivity to the supports.

In one embodiment, thin protective coatings may be provided on the support structure 110 on the cathode or anode side of the fuel cell unit 100 (e.g., a coating that is thinner than the cathode layer 170 and/or the anode layer 150) to increase the conductivity of the oxide scale or prevent chromium evaporation and poisoning of the electrodes (e.g., anode layer 150, electrolyte layer 160, and/or cathode layer 170 of FIG. 2). The protective coatings can be formed from materials such as, e.g., cobalt, manganese, a combination of cobalt and manganese, electron-conducting ceramics, and the like.

Figure 3:
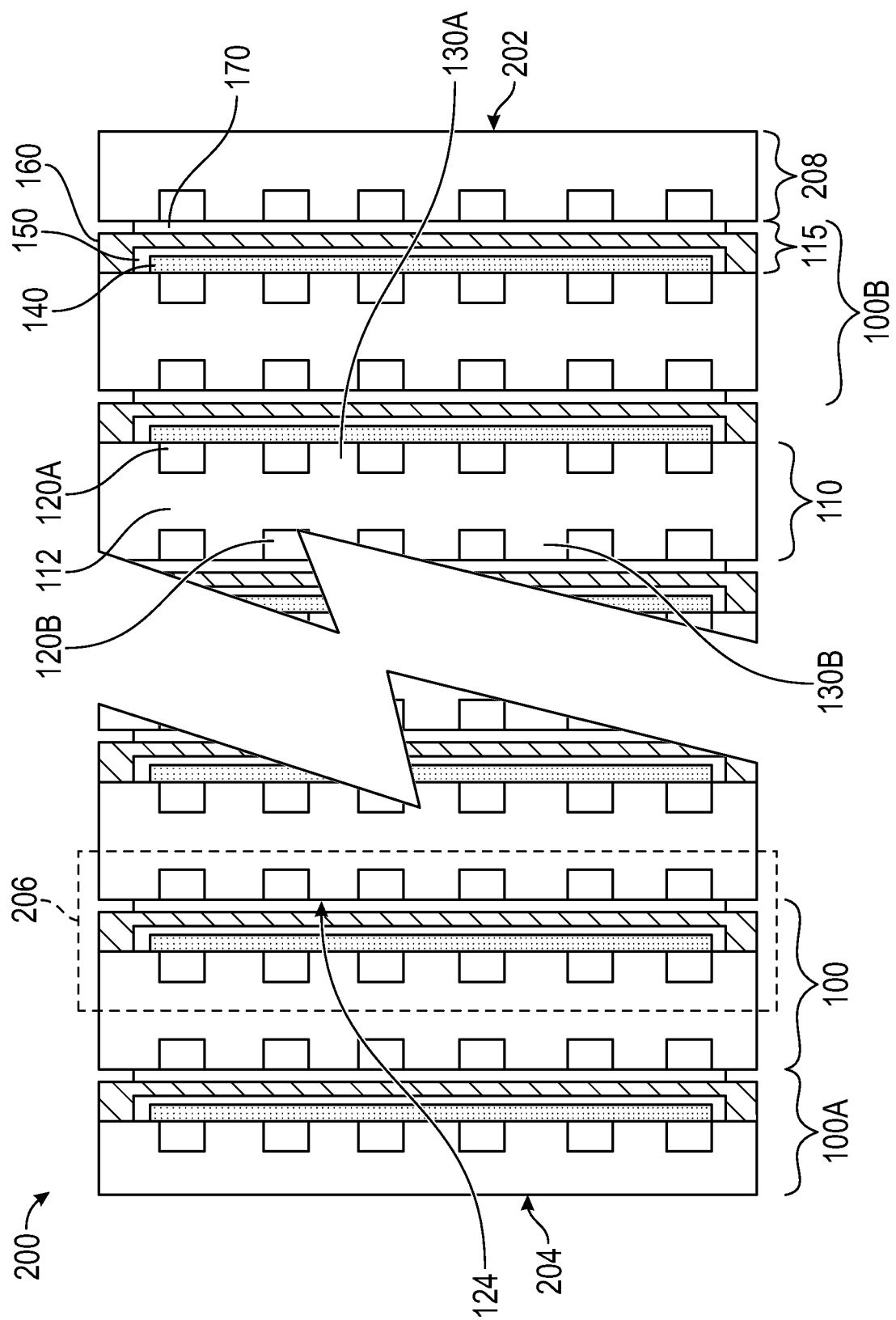
FIG. 3 illustrates a cross-sectional side view of a stack of several fuel cell units shown in FIGS. 1 and 2 according to an embodiment of the present disclosure.

FIG. 3 illustrates one embodiment of a cross-sectional view of a stack 200 of several fuel cell units 100 shown in FIGS. 1 and 2. The number of fuel cell units 100 in the stack 200 is provided as one example. A greater or lesser number of fuel cell units 100 may be included in the stack 200. The stack 200 is shown in a cross-sectional view through a plane that is the same plane as shown in FIG. 2 for the individual fuel cell unit 100. The stack 200 extends from an inlet end 202 to an opposite end 204. Air and/or fuel flows in the flow channels 120A, 120B of each fuel cell unit 100 in a direction that extends into the support structure 110 of each fuel cell unit 100.

The fuel cell units 100 can be placed into contact with each other so that several of the fuel cell units 100 have the open side 124 of the support structure 110 in contact with the active layer membrane 115 of another fuel cell unit 100. This can enclose the flow channels 120B between the plate 112 of one fuel cell unit 100, two protrusions 130B of the same fuel cell unit 100, and the active layer membrane 115 of another fuel cell unit 100, as shown in FIG. 3. This manner of stacking the fuel cell units 100 forms several fuel cells 206, with each of these fuel cells 206 formed from part, but not all, of two fuel cell units 100. An end fuel cell unit 100 (e.g., the fuel cell unit 100A in FIG. 3) may not have the protrusions 130B or flow channels 120B on one side of the plate 112 of that fuel cell unit 100A. Another end fuel cell unit 100 (e.g., the fuel cell unit 100B in FIG. 3) may be connected with an end cap support structure 208. The end cap support structure 208 may be part of a support structure 110 that includes the plate 112 and protrusions 130B (and corresponding channels 120B), but not the protrusions 130A (or corresponding channels 120A).

Stacking the fuel cell units 100 against each other forms the several fuel cells 206, as shown in FIG. 3. The number of fuel cells 206 in each stack 200 can be increased by including more fuel cell units 100 in the stack 200. Within each fuel cell 206, fuel flows on one side of the active layer membrane 115 in the flow channels 120A of one fuel cell unit 100, while air flows on the other side of the same active layer membrane 115 in the flow channels 120B of another fuel cell unit 100. At least some of the fuel can pass through the porous support layer 140 to reach the anode layer 150 and the air can contact the cathode layer 170 so that the fuel cell 206 can generate electric current. Alternatively, air can flow on one side of the active layer membrane 115 in the flow channels 120A of one fuel cell unit 100 in a fuel cell 206, while fuel flows on the other side of the same active layer membrane 115 in the flow channels 120B of another fuel cell unit 100. At least some of the air can pass through the porous support layer 140 to reach the cathode layer 170 that is on the porous support layer 140 and the fuel can contact the anode layer 150 on the opposite side of the active layer membrane 115 so that the fuel cell 206 can generate electric current.

The fuel cells 206 can be connected in series with each other so that the electric current generated in the fuel cells 206 is additively combined. The current generated by each fuel cell 206 can be conducted through the support structure 110 to a conductive body (e.g., a bus, wires, or the like) that is connected with several fuel cells 206. Alternatively, two or more of the fuel cells 206 may be connected in parallel with each other. This electric current can be conducted out of the stack 200 and out of a housing (see, e.g., housing 2010 shown in FIG. 10) by one or more conductive bodies, such as one or more buses, wires, cables, or the like.

Figure 4:
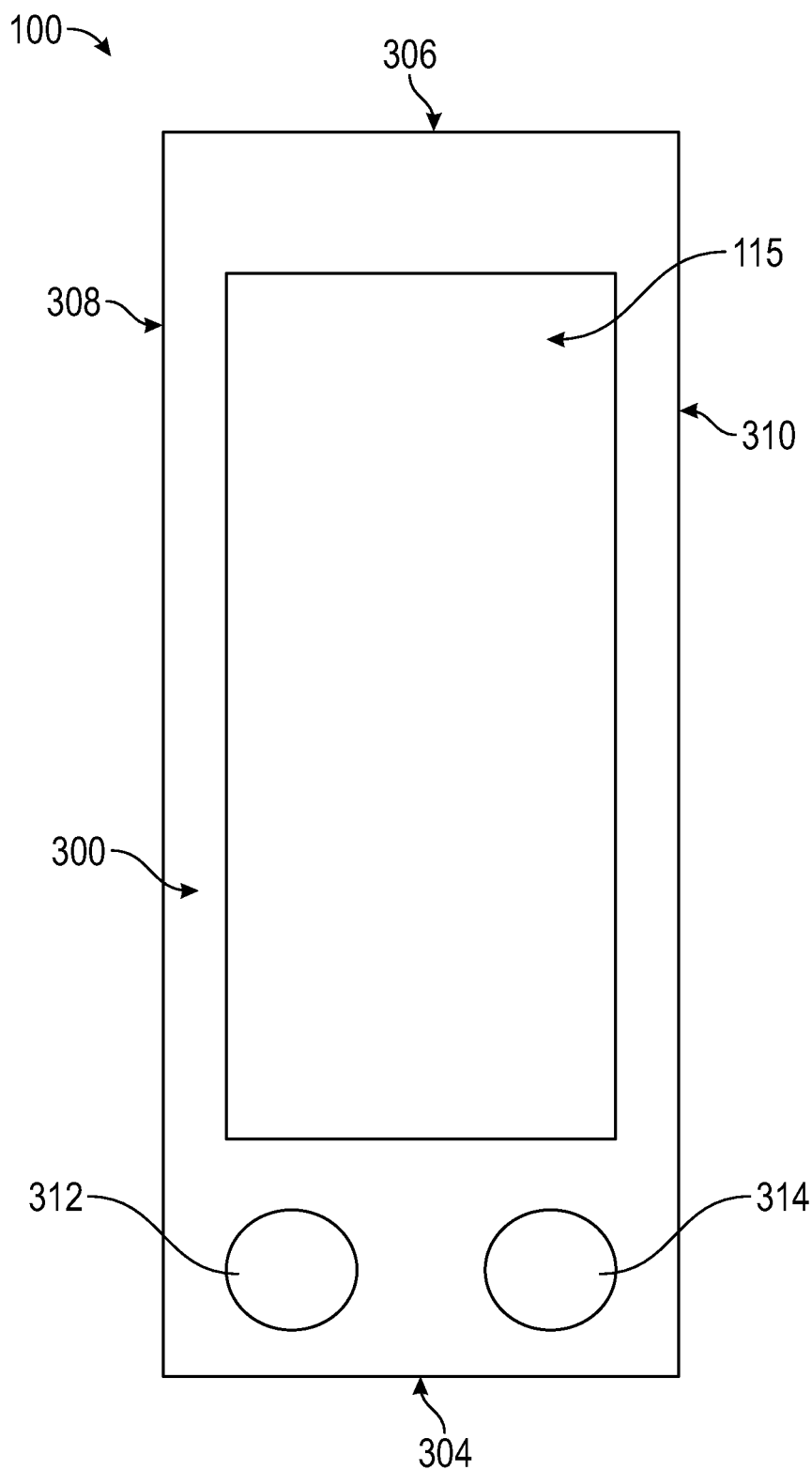
FIG. 4 illustrates a top view of a catalyst side of the fuel cell unit of FIG. 1 according to an embodiment of the present disclosure.

FIG. 4 illustrates a view of one embodiment of a catalyst side 300 of a fuel cell unit 100. The fuel cell unit 100 represents part of one or more fuel cells that are included in a stack (e.g., fuel cell 206 of stack 200 of FIG. 3) and/or a housing (see, e.g., housing 2010 shown in FIG. 10). The fuel cell unit 100 extends from an inlet end 304 to an opposite outlet end (or combustion end) 306 along a first direction, from the catalyst side 300 to an opposite open side (not visible in FIG. 4 but shown in FIG. 2) along a second direction that is orthogonal to the first direction, and from one edge 308 to an opposite edge 310 along a third direction that is orthogonal to the first and second directions. The first direction can be referred to as a flow direction as this is the direction that air and fuel flow in flow channels of the fuel cell unit 100 (e.g., flow channels 120A, 120B), as described above. The second direction can be referred to as a thickness direction or a cross-over direction, as the thickness of the fuel cell unit 100 is measured along this second direction and fuel or air crosses over and out of the flow channels to a catalyst stack or an active layer membrane in this direction, as described above. The third direction can be referred to as a width direction of the fuel cell unit 100. The outlet end 306 of the fuel cell unit 100 may be located at or be coextensive with an outlet side of a housing (see, e.g., outlet side 2012 of housing 2010 of FIG. 10). The inlet end 304 may be located at or inside a side of a housing (see, e.g., side 2016 of housing 2010 of FIG. 10), the edge 308 may be at or inside a side of a housing (see, e.g., side 2015 of housing 2010 of FIG. 10), and the opposite edge 310 may be at or inside an opposite side of a housing (see, e.g., side 2014 of housing 2010 of FIG. 10).

Figure 10:
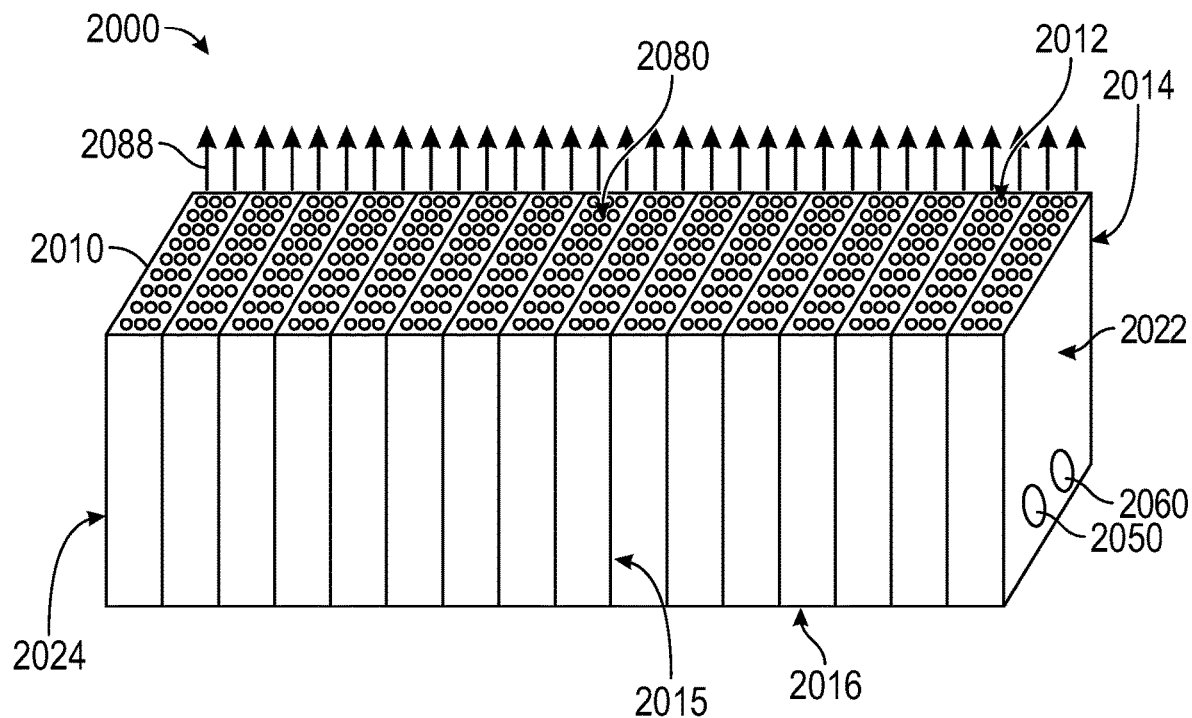
FIG. 10 illustrates an integrated fuel cell and combustion system according to one embodiment of the present disclosure.

Several fuel cell units 100 can be stacked or sandwiched together inside a housing (see, e.g., stack 200 of FIG. 3 and/or housing 2010 shown in FIG. 10). For example, several fuel cell units 100 can be placed into contact with each other so that the catalyst sides 300 of the fuel cell units 100 face the inlet side of a housing (see, e.g., inlet side 2022 of housing 2010 shown in FIG. 10). The catalyst side 300 represents the side of the fuel cell unit 100 that has several catalyst layers in the active layer membrane 115 of the fuel cell unit 100. These layers, as discussed above, include an anode layer, a cathode layer, and an electrolyte layer (e.g., a solid oxide layer) disposed between the anode layer and the cathode layer (see, e.g., anode layer 150, electrolyte layer 160, and/or cathode layer 170 of FIG. 2). The fuel cell unit 100 includes a fuel inlet 312 and an air inlet 314 to provide fuel and air, respectively, to the flow channels 120A and/or 120B of the fuel cell unit 100. The fuel inlet 312 can be aligned with or otherwise fluidly coupled with a fuel inlet of a housing (see, e.g., fuel inlet 2050 of housing 2010 of FIG. 10) and the air inlet 314 can be aligned with or otherwise fluidly coupled with an air inlet of a housing (see, e.g., air inlet 2060 of housing 2010 of FIG. 10). When the fuel cell units 100 are stacked against each other (see, e.g., stack 200 of FIG. 3), the fuel inlets 312 can be aligned or otherwise fluidly coupled with a fuel inlet so that the flow channels 120A or 120B of the fuel cell units 100 receive fuel injected into a housing via the fuel inlet (see, e.g., fuel inlet 2050 of housing 2010 of FIG. 10). The air inlets 314 can be aligned or otherwise fluidly coupled with an air inlet so that the flow channels 120A or 120B of the fuel cell units 100 receive air injected into a housing via the air inlet (see, e.g., air inlet 2060 of housing 2010 of FIG. 10).

Figure 5A:
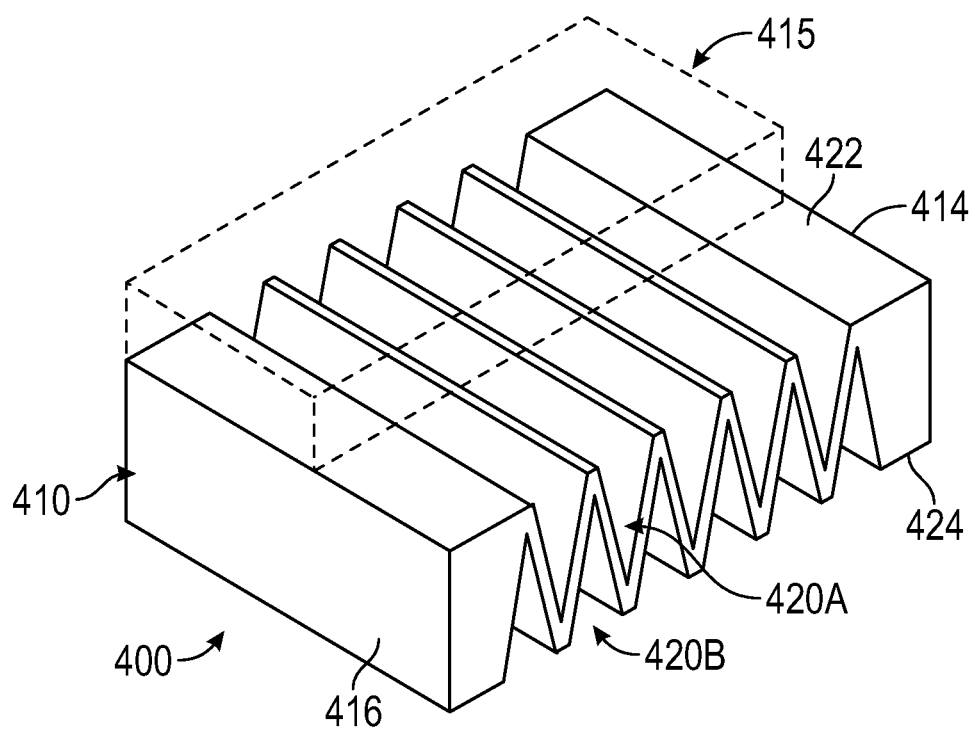
FIG. 5A illustrates a perspective view of a fuel cell unit according to an embodiment of the present disclosure.

In accordance with the principles of the disclosure, the flow channels can be configured in a compact arrangement. By creating flow channels in a compact arrangement, the size, volume, and/or weight of the fuel cell unit can be reduced, which allows for a more compact structure, as well as a reduced cost. This also may provide for increased power density. Referring to FIG. 5A, an exemplary configuration is shown and described. In particular, FIG. 5A illustrates a fuel cell unit 400 according to another embodiment. As shown in FIG. 5A, the fuel cell unit 400 includes a support structure 410 and an active layer membrane 415, which can include, for example, a porous support layer, an anode layer, an electrolyte layer, and/or a cathode layer (see, e.g., porous support layer 140, anode layer 150, electrolyte layer 160, and cathode layer 170 of FIG. 2). In the embodiment of FIG. 5A, the support structure 410 extends from a first side 414 to a second side 416, with the support structure 410 having a plurality of flow channels 420A, 420B. According to one embodiment, the flow channels 420A on one side of the support structure 410 (e.g., side 422) can be fuel channels or passages through which fuel flows through the fuel cell unit 400, while the flow channels 420B on the opposite side of the support structure 410 (e.g., side 424) can be air channels or passages through which air flows through the fuel cell unit 400. Alternatively, the flow channels 420A on one side of the support structure 410 (e.g., side 422) can be air channels or passages through which air flows through the fuel cell unit 400 and the flow channels 420B on the opposite side of the support structure 410 (e.g., side 424) can be fuel channels or passages through which fuel flows through the fuel cell unit 400.

Figure 5B:
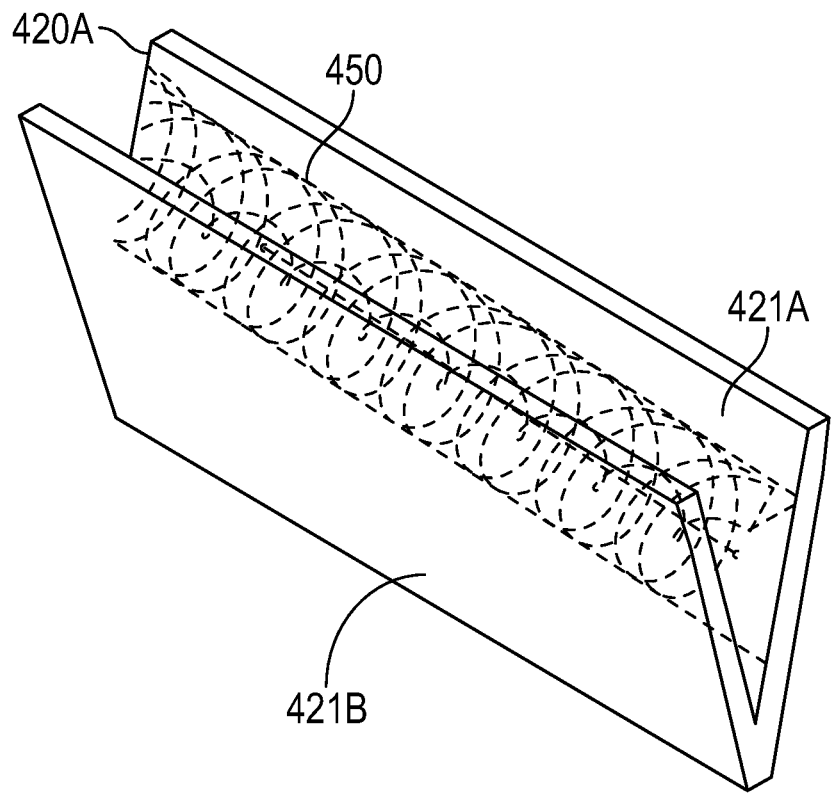
FIG. 5B illustrates an expanded view of one flow channel of the fuel cell unit of FIG. 5A according to an embodiment of the present disclosure.

As further shown in the embodiment of FIGS. 5A and 5B, the flow channels 420A, 420B are positioned in an alternating or zig-zag and/or see-saw configuration, such that the flow channels 420A on the side of the support structure 410 that includes the active layer membrane 415 (e.g., side 422) alternate with the flow channels 420B on the opposite side of the support structure 410 (e.g., side 424) in a zig-zag configuration. According to one embodiment, the walls (see, e.g., walls 421A, 421B of FIG. 5B) of each of the flow channels 420A, 420B are positioned from 45 degrees to 90 degrees from each other, such that one wall (see, e.g., wall 421A of FIG. 5B) of a flow channel 420A, 420B can be positioned perpendicular to the other wall (see, e.g., wall 421B of FIG. 5B) of the same flow channel 420A, 420B. Thus, in contrast to the embodiment of FIGS. 1 and 2, the support structure 410 of FIG. 5A does not comprise a plate having a plurality of protrusions that forms the flow channels on each side of the plate (see, e.g., plate 112 with protrusions 130A, 130B and channels 120A and 120B of FIGS. 1 and 2). By creating the flow channels 420A, 420B in this alternating or zig-zag configuration of the embodiment of FIG. 5A, the size, volume, and/or weight of the fuel cell unit 400 can be reduced, which allows for a more compact structure, as well as a reduced cost. For example, according to one embodiment, the height of the support structure 410 (i.e., the height from the side (or surface) 422 to the side (or surface) 424 of the support structure 410) can be reduced to about 2 mm, which is greatly reduced from the height of the support structure 110 of the fuel cell unit 100 of FIGS. 1 and 2 (i.e., the height from the side (or surface) 122 to the opposite side (or surface) 124 of the support structure 110), which is generally around 5 mm.

Additionally, by creating the flow channels 420A, 420B in the alternating or zig-zag configuration of the embodiment of FIG. 5A, the fuel cell unit 400 can further have an increased power density. For example, as shown in FIG. 5B, this zig-zag configuration of the flow channels 420A, 420B creates a swirling channel 450 (or swirl geometry) in either or both of the flow channels 420A, 420B that can more effectively separate reacted and unreacted gases. This swirling channel 450 (or swirl geometry) can also assist in preventing and/or disrupting a boundary layer from forming near the surface of the electrodes of the active layer membrane 415 where reactions occur (see, e.g., anode layer 150, electrolyte layer 160, and/or cathode layer 170 of FIG. 2). According to one embodiment, this alternating or zig-zag configuration of the flow channels 420A, 420B of the embodiment of FIG. 5A can result in a disruption to the formation of a boundary layer, which can lead to a reduction of mass transport cell polarization which in turn can lead to a higher cell output power (e.g., power density).

Figures 6A, 6B:
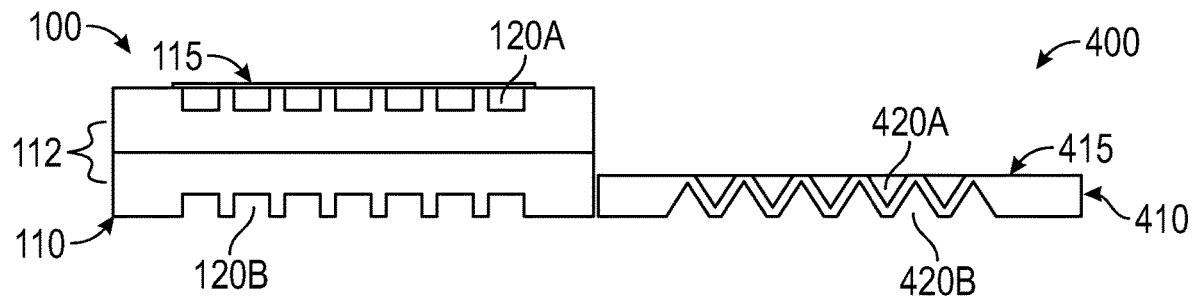
FIG. 6A illustrates a side view of the fuel cell unit of FIG. 1 according to an embodiment of the present disclosure.
FIG. 6B illustrates a side view of the fuel cell unit of FIG. 5A according to an embodiment of the present disclosure.

The advantages of the fuel cell unit 400 of FIG. 5A are further illustrated in FIGS. 6A, 6B, 7A and 7B with respect to the fuel cell unit 100 of FIGS. 1 and 2. For example, as shown in FIGS. 6A and 6B, which are drawn to scale relative to each other, the size and/or height of the fuel cell unit 400 can be greatly decreased with respect to the size and/or height of the fuel cell unit 100, while retaining the same channel size in the flow channels 420A, 420B. According to one embodiment, channel heights can be optimized by adjusting the channel height and/or width to maximize cell volumetric and gravimetric power density. While decreasing channel size might lead to backpressure to the flow rate, various parameters can be optimized to maximize cell power while maintaining the desired backpressure for, e.g., an engine. As discussed above, according to one embodiment, the height of the support structure 410 (i.e., the height from the side (or surface) 422 to the side (or surface) 424 of the support structure 410 of FIG. 5A) can be reduced to about 2 mm, which is greatly reduced from the height of the support structure 110 of the fuel cell unit 100 of FIGS. 1 and 2 (i.e., the height from the side (or surface) 122 to the opposite side (or surface) 124 of the support structure 110 of FIG. 2), which is generally around 5 mm. This decrease in the size and/or height of the fuel cell unit 400 relates to at least the removal of the plate 112 of the support structure 110 of the fuel cell unit 100, as well as the alternating or zig-zag configuration of the flow channels 420A, 420B of the fuel cell unit 400. According to one embodiment, this configuration of the fuel cell unit 400, as well as its decrease in size, can be accomplished by creating the fuel cell unit 400 via additive manufacturing. Additive manufacturing can involve joining or solidifying material under computer control to create a three-dimensional object, such as, e.g., by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the fuel cell unit 400 can be formed in another manner.

Figures 7A, 7B:
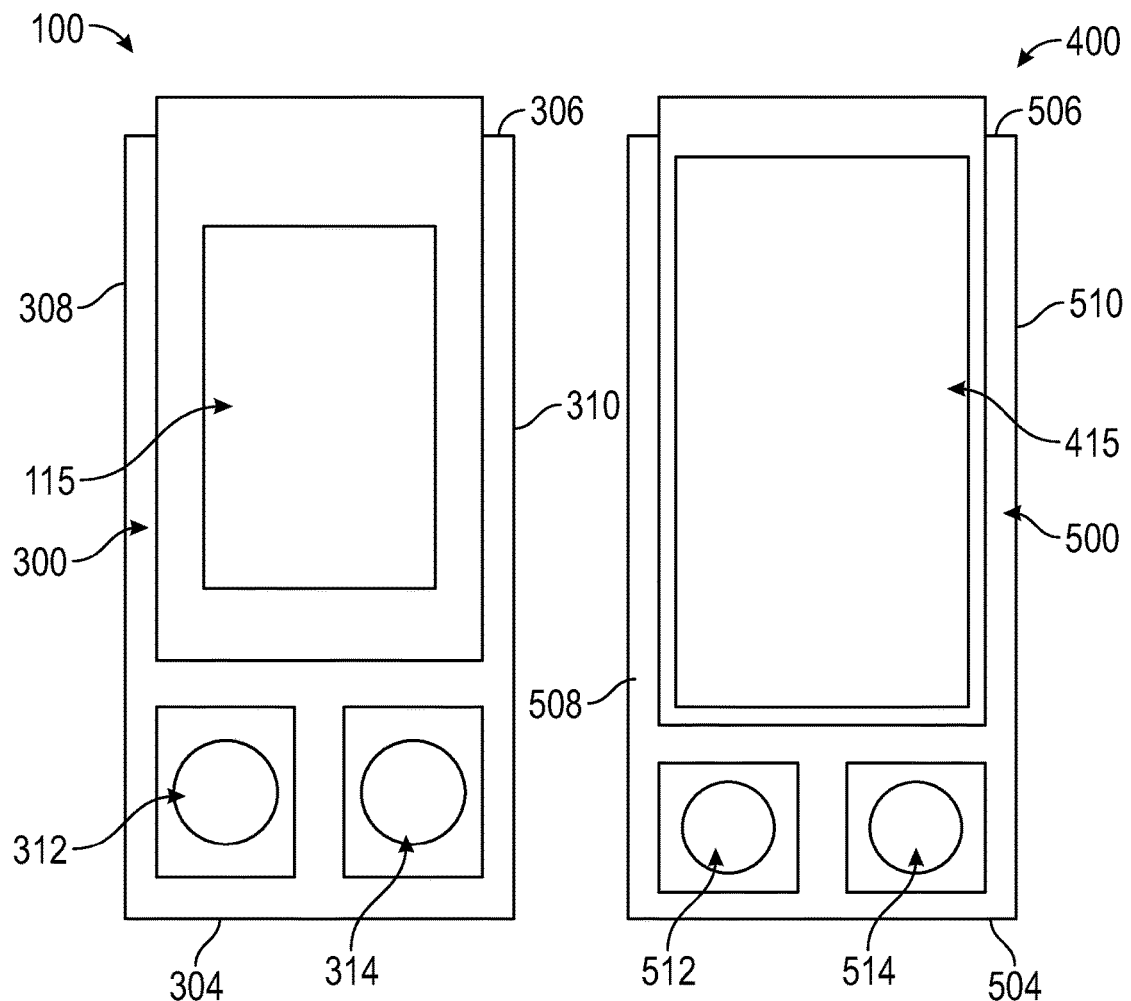
FIG. 7A illustrates a top view of a catalyst side of the fuel cell unit of FIG. 1 according to an embodiment of the present disclosure.
FIG. 7B illustrates a top view of a catalyst side of the fuel cell unit of FIG. 5A according to an embodiment of the present disclosure.

According to another embodiment, the alternating or zig-zag configuration of the flow channels 420A, 420B of the fuel cell unit 400 of FIG. 5A results in an increase in the area of the active layer membrane 415 or cathode active area. Such an increase in the active area of the active layer membrane 415 can occur by, for example, minimizing the width of the exterior walls of the fuel cell unit (e.g., fuel cell unit 100). For example, as shown in FIGS. 7A and 7B, which are drawn to scale relative to each other, the fuel cell unit 100 of the embodiment of FIGS. 1 and 2 includes a catalyst side 300, which represents the side of the fuel cell unit 100 that has several catalyst layers in the active layer membrane 115 of the fuel cell unit 100. These layers, as discussed above, include an anode layer, a cathode layer, and an electrolyte layer (e.g., a solid oxide layer) disposed between the anode layer and the cathode layer (see, e.g., anode layer 150, electrolyte layer 160, and/or cathode layer 170 of FIG. 2). The fuel cell unit 100 further includes a fuel inlet 312 and an air inlet 314. As shown in the embodiment of FIG. 7B, the fuel cell unit 400 of the embodiment of FIG. 5A also includes a catalyst side 500, which represents the side of the fuel cell unit 400 that has several catalyst layers in the active layer membrane 415 of the fuel cell unit 400. Again, these layers, as discussed above, include an anode layer, a cathode layer, and an electrolyte layer (e.g., a solid oxide layer) disposed between the anode layer and the cathode layer (see, e.g., anode layer 150, electrolyte layer 160, and/or cathode layer 170 of FIG. 2). The fuel cell unit 400 further includes a fuel inlet 512 and an air inlet 514. However, as shown in the embodiment of FIG. 7B, the size of the active layer membrane 415 or cathode active area of the fuel cell unit 400 can be increased, as compared to the active layer membrane 115 or cathode active area of the fuel cell unit 100 of FIG. 7A, due to, for example, the alternating or zig-zag configuration of the flow channels 420A, 420B of the fuel cell unit 400, which can result in an increase in the performance and/or power density of the fuel cell unit 400.

Figure 8A:
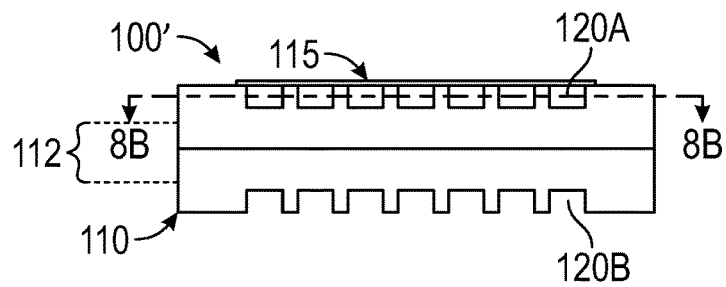
FIG. 8A illustrates a side view of a fuel cell unit according to an embodiment of the present disclosure.
Figure 8B:
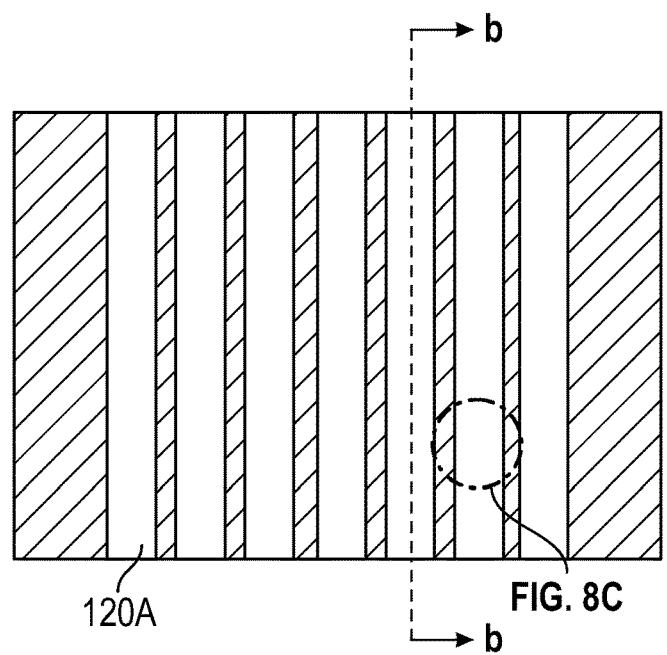
FIG. 8B illustrates a cross-sectional view of the fuel cell unit of FIG. 8A, taken along line 8B-8B shown in FIG. 8A.
Figure 8C:
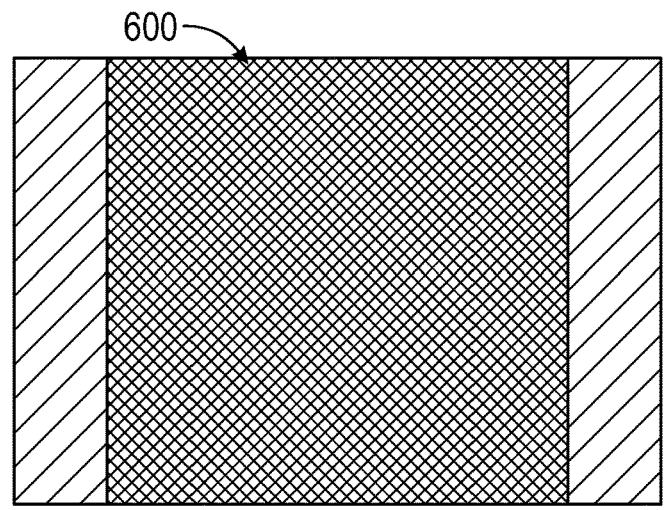
FIG. 8C illustrates an expanded, partial view of one flow channel of the fuel cell unit of FIG. 8B according to an embodiment of the present disclosure.

FIGS. 8A-8C illustrate a fuel cell unit 100' according to an embodiment. As shown in FIG. 8A, the fuel cell unit 100' includes a support structure 110 and an active layer membrane 115, which can include, for example, a porous support layer, an anode layer, an electrolyte layer, and/or a cathode layer (see, e.g., porous support layer 140, anode layer 150, electrolyte layer 160, and cathode layer 170 of FIG. 2). Similar to the embodiment of the fuel cell unit 100 of FIGS. 1 and 2, in the embodiment of FIG. 8A, the support structure 110 includes a plate 112 with protrusions (see, e.g., protrusions 130A, 130B of FIG. 2) that create a plurality of flow channels 120A, 120B. According to one embodiment, the flow channels 120A can be fuel channels or passages through which fuel flows through the fuel cell unit 100', while the flow channels 120B can be air channels or passages through which air flows through the fuel cell unit 100'. Alternatively, the flow channels 120A can be air channels or passages through which air flows through the fuel cell unit 100' and the flow channels 120B can be fuel channels or passages through which fuel flows through the fuel cell unit 100'.

According to one embodiment, either or both of the flow channels 120A, 120B of the fuel cell unit 100' of FIGS. 8A-8C further includes one or more enhancement features that are configured to prevent and/or disrupt a formation of a boundary layer near a surface of the active layer membrane 115 where reactions occur (e.g., near the surface of the electrodes of the active layer membrane 115 where reactions occur (see, e.g., anode layer 150, electrolyte layer 160, and/or cathode layer 170 of FIG. 2)). For example, according to the embodiment of FIGS. 8B and 8C, the flow channels 120A can include a webbing material 600 that is made of, for example, metal wires, and that is attached to a surface of each flow channel 120A of the plurality of flow channels 120A, with the webbing material 600 being configured to disrupt the formation of a boundary layer near a surface of the active layer membrane 115 where reactions occur (e.g., one or more of the electrode layers discussed above). According to another embodiment, the webbing material 600 can also improve the ability of the flow channels 120A and/or fuel cell unit 100' to handle high pressure operations. While the embodiment of FIGS. 8A-8C only illustrate the webbing material 600 being attached to one set of the flow channels 120A of the support structure 110, the webbing material 600 can also be, or can alternatively be, attached to the other set of flow channels 120B of the support structure 110.

Figure 9A:
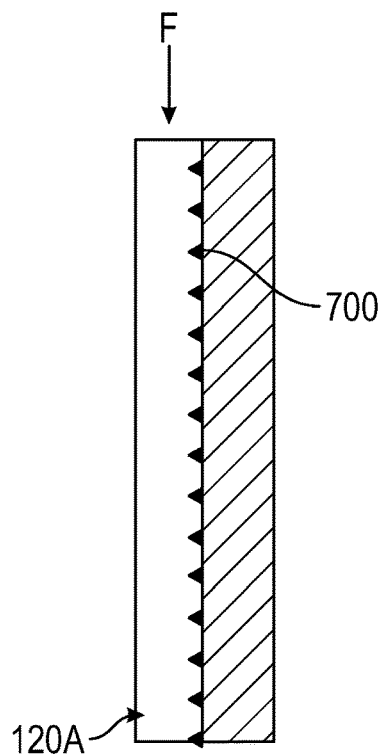
FIG. 9A illustrates a cross-sectional top view of one flow channel of the fuel cell unit of FIGS. 8A and 8B, taken along line b-b shown in FIG. 8B according to an embodiment of the present disclosure.
Figure 9B:
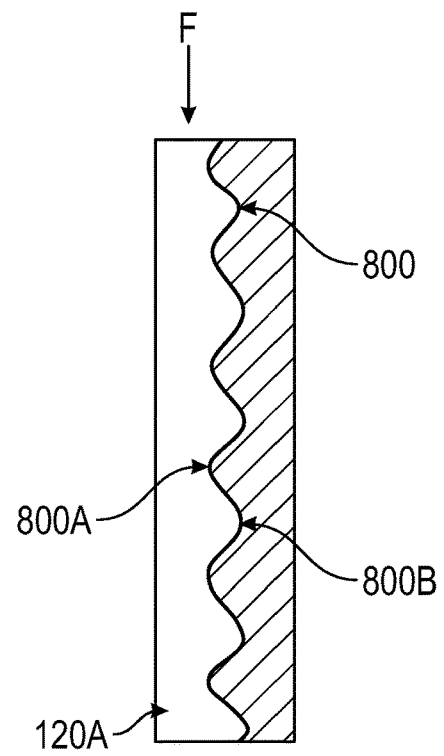
FIG. 9B illustrates a cross-sectional top view of one flow channel of the fuel cell unit of FIGS. 8A and 8B, taken along line b-b shown in FIG. 8B according to another embodiment of the present disclosure.
Figure 9C:
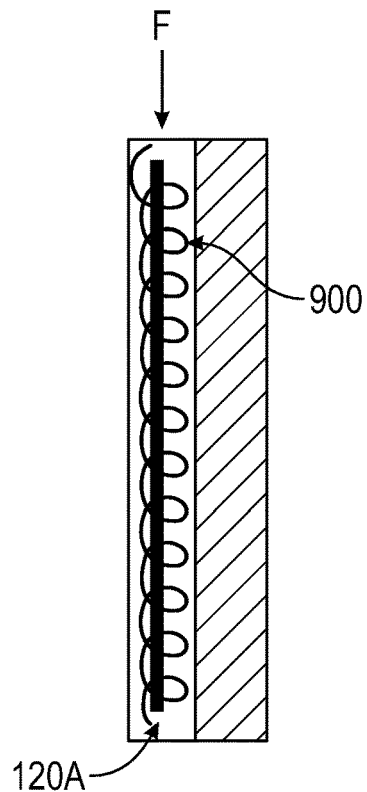
FIG. 9C illustrates a cross-sectional top view of one flow channel of the fuel cell unit of FIGS. 8A and 8B, taken along line b-b shown in FIG. 8B according to another embodiment of the present disclosure.

According to another embodiment, the flow channels 120A of the support structure 110 of the fuel cell unit 100' of FIG. 8A can include one or more enhancement features in the form of a plurality of internal three-dimensional features. These features can be in addition to the webbing material 600 of FIG. 8C or an alternative to the webbing material 600 of FIG. 8C. For example, as shown in FIG. 9A, the one or more enhancement features can comprise a plurality of internal bumps 700 disposed along the length of one or more of the sidewalls of the flow channels 120A. According to one embodiment, the internal bumps 700 are disposed along the interior surface of one or more of the sidewalls of the flow channels 120A (see, e.g., FIG. 9A). According to another embodiment, the internal bumps 700 are disposed along the underside of the porous support layer (see, e.g., porous support layer 140 of FIG. 2), e.g., the surface of the porous support layer that faces the flow channels 120A. These internal bumps 700 are configured to, for example, create turbulence in the flow in the flow channels 120A and thereby reset the formation of a potential boundary layer at every bump 700. FIG. 9B illustrates another embodiment in which the one or more enhancement features can comprise a plurality of internal humps 800 disposed along the length of one or more sidewalls of the flow channels 120A, with each internal hump 800 including a protruding portion 800A (or convex portion) that extends into the flow channel 120A and a recessed portion 800B (or concave portion) that extends away from the flow channel 120A. These internal humps 800 are configured to, for example, reset the formation of a potential boundary layer at every hump 800. FIG. 9C illustrates another embodiment in which the one or more enhancement features are in the form of a helix shape 900 this is disposed along the flow channels 120A. According to one embodiment, the helix shape 900 can be formed on the inside of the flow channels 120A and transverse the length of the respective flow channels 120A. According to another embodiment, the helix shape 900 can be formed by creating reticulated pieces within the flow channels 120A that form turbulators. This helix or swirl shape 900 is configured to make the flow of air and/or gas through the flow channels 120A rotate and/or move along the length of the flow channels 120A in a perpendicular motion to thus disrupt the formation of any boundary layer(s) along the length of the flow channels 120A. While the embodiments of FIGS. 9A-9C only illustrate the various enhancement features (700, 800, 900) being disposed along one set of the flow channels 120A of the support structure 110, the various enhancement features (700, 800, 900) can also be, or can alternatively be, disposed along the other set of flow channels 120B of the support structure 110.

According to each of the various embodiments for the enhancement features discussed above, the enhancement features are configured to disrupt the formation of a boundary layer near a surface of the active layer membrane 115 where reactions occur (e.g., one or more of the electrode layers discussed above). For example, according to one embodiment, each of the enhancement features are configured to create turbulence and/or rotation of the air and/or fuel as it flows along the direction F of the flow channel 120A (see, e.g., FIGS. 9A-9C). This creation of turbulence and/or rotation of the flow assists in preventing and/or disrupting the formation of a boundary layer near a surface of the active layer membrane 115 where reactions occur (e.g., one or more of the electrode layers discussed above).

Figure 9D:
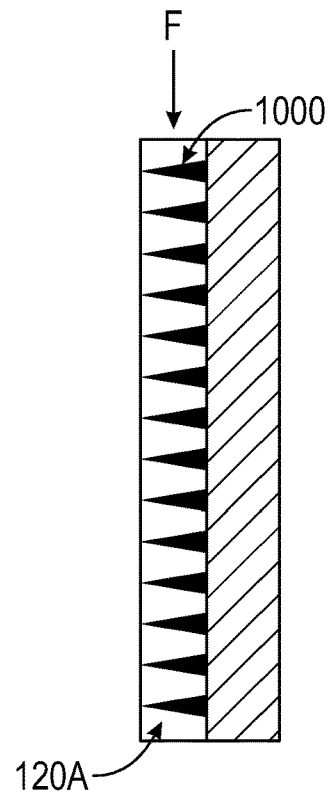
FIG. 9D illustrates a cross-sectional top view of one flow channel of the fuel cell unit of FIGS. 8A and 8B, taken along line b-b shown in FIG. 8B according to yet another embodiment of the present disclosure.

According to one embodiment, a plurality of internal pillars can be positioned within each flow channel of the plurality of flow channels, with the plurality of internal pillars being configured to allow for pressurization of the fuel cell unit. For example, as shown in FIG. 9D, a plurality of internal pillars 1000 are disposed along the length of one or more sidewalls of the flow channels 120A. According to this embodiment, the plurality of internal pillars 1000 can support pressure that can arise in the fuel cell unit and/or the fuel cells themselves, which allows for additional pressurization of the fuel cell unit. For example, according to one embodiment, the internal pillars 1000 extend across the width and/or height of the flow channels 120A in multiple places such that the internal pillars 1000 can act as internal support structures which improve the tolerance to high internal pressure, including, e.g., if the internal pillars 1000 attach to the porous support layer (see, e.g., porous support layer 140 of FIG. 2) at a plurality of points. While the embodiment of FIG. 9D only illustrates the plurality of internal pillars 1000 being disposed along one set of the flow channels 120A of the support structure 110, the plurality of internal pillars 1000 can also be, or can alternatively be, disposed along the other set of flow channels 120B of the support structure 110.

According to one embodiment, the above-discussed webbing material (e.g., webbing material 600 of FIG. 8C), the various enhancement features (700, 800, 900), and/or the plurality of internal pillars 1000 can be manufactured additively. Additive manufacturing can involve joining or solidifying material under computer control to create a three-dimensional object, such as, e.g., by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the above-discussed webbing material (e.g., webbing material 600 of FIG. 8C), the various enhancement features (700, 800, 900), and/or the plurality of internal pillars 1000 can be formed in another manner.

FIG. 10 illustrates one embodiment of an integrated fuel cell and combustion system 2000. The system 2000 includes an outer housing 2010 having a combustion outlet side 2012 and an opposite side 2016, a fuel and air inlet side 2022 and an opposite side 2024, and opposite sides 2014, 2015. The sides 2016, 2014 and 2024 are not visible in the perspective of FIG. 10. The shape of the outer housing 2010 may differ from what is shown in FIG. 10. For example, the outer housing 2010 need not have a rectangular or cubic shape in another embodiment.

The outlet side 2012 includes several combustion outlets 2080 from which combustion 2088 is directed out of the housing 2010. As described herein, the combustion 2088 can be created using fuel and air that is not consumed by fuel cells in a fuel cell stack inside the housing 2010 (see, e.g., FIG. 3). This combustion 2088 can be used to generate propulsion or thrust for a vehicle, such as a manned or unmanned aircraft.

The inlet side 2022 includes one or more fuel inlets 2050 and one or more air inlets 2060. Optionally, one or more of the inlets 2050, 2060 can be on another side of the outer housing 2010. The fuel inlet 2050 is fluidly coupled with a source of fuel for the fuel cells, such as one or more pressurized containers of a hydrogen-containing gas. Alternatively, another type or source of fuel may be used. The air inlet 2060 is fluidly coupled with a source of air for the fuel cells, such as one or more pressurized containers of oxygen gas. Alternatively, another source of air may be provided. The inlets 2050, 2060 separately receive the fuel and air from the external sources of fuel and air, and separately direct the fuel and air into the fuel cells.

In one embodiment, the inlet side 2022 and the outlet side 2012 may be the only sides of the housing 2010 that are not sealed. For example, the housing 2010 may be sealed to prevent ingress or egress of fluids (gas and/or liquid) into and out of the housing 2010, but for the fuel and air inlets 2050, 2060 and the combustion outlets 2080. The air and fuel that is directed into the housing 2010 via the inlets 2050, 2060 may be entirely or substantially consumed (e.g., at least 98% of the volume or mass is consumed) by the fuel cells inside the housing 2010 and/or the generation of combustion 2088. This can allow for the housing 2010 to have no other outlet through which any fuel or air passes aside from the combustion outlets 2080 through which the combustion 2088 exits the housing 2010.

In one embodiment, the system 2000 can be formed from one hundred fuel cells stacked side-by-side from the end 2022 to the end 2024. Alternatively, the system 2000 can include fewer or more fuel cells stacked side-by-side. According to one embodiment, the system 2000 can be eight centimeters tall, 2.5 centimeters wide, and twenty-four centimeters long. Alternatively, the system 2000 can be taller or shorter, wider or narrower, and/or longer or shorter than these example dimensions.

The fuel cell unit 100 of FIGS. 1 and 2, as well as the fuel cell units 400 and 100' illustrated in the embodiments of FIGS. 5A-9D, respectively, can represent part of one or more fuel cells that are included in the housing 2010 shown in FIG. 10. Additionally, as discussed above, FIG. 4, FIG. 7A and FIG. 7B illustrate views of one embodiment of a catalyst side 300, 500 of the fuel cell unit 100, 400 of FIGS. 1 and 5A, respectively. According to one embodiment, the outlet end 306, 506 of the fuel cell unit 100, 400 may be located at or be coextensive with the outlet side 2012 (shown in FIG. 10) of the housing 2010. For example, the outlets 2080 shown in FIG. 10 may be the outlet ends 306, 506 (FIGS. 7A and 7B) of a stack of several fuel cell units 100, 400. The inlet end 304, 504 (FIGS. 7A and 7B) may be located at or inside the side 2016 of the housing 2010, the edge 308, 508 may be at or inside the side 2015 of the housing 2010, and the opposite edge 310, 510 may be at or inside the opposite side 2014 of the housing 2010.

Several fuel cell units (e.g., fuel cell units 100, 400, and/or 100') can be stacked or sandwiched together inside the housing 2010. For example, several fuel cell units (e.g., fuel cell units 100, 400, and/or 100') can be placed into contact with each other so that the catalyst sides (e.g., catalyst side 300 and/or 500) of the respective fuel cell units (e.g., fuel cell units 100, 400, and/or 100') face the inlet side 2022 of the housing 2010. The fuel inlet (e.g., fuel inlet 312 and/or 512) can be aligned with or otherwise fluidly coupled with the fuel inlet 2050 of the housing 2010 and the air inlet (e.g., air inlet 314 and/or 514) can be aligned with or otherwise fluidly coupled with the air inlet 2060 of the housing 2010. When the fuel cell units (e.g., fuel cell units 100, 400, and/or 100') are stacked against each other, the fuel inlets e.g., fuel inlet 312 and/or 512) can be aligned or otherwise fluidly coupled with the fuel inlet 2050 so that the fuel cell units (e.g., fuel cell units 100, 400, and/or 100') receive fuel injected into the housing 2010 via the fuel inlet 2050. The air inlets (e.g., air inlet 314 and/or 514) can be aligned or otherwise fluidly coupled with the air inlet 2060 so that the fuel cell units (e.g., fuel cell units 100, 400, and/or 100') receive air injected into the housing 2010 via the air inlet 2060.

Figure 11:
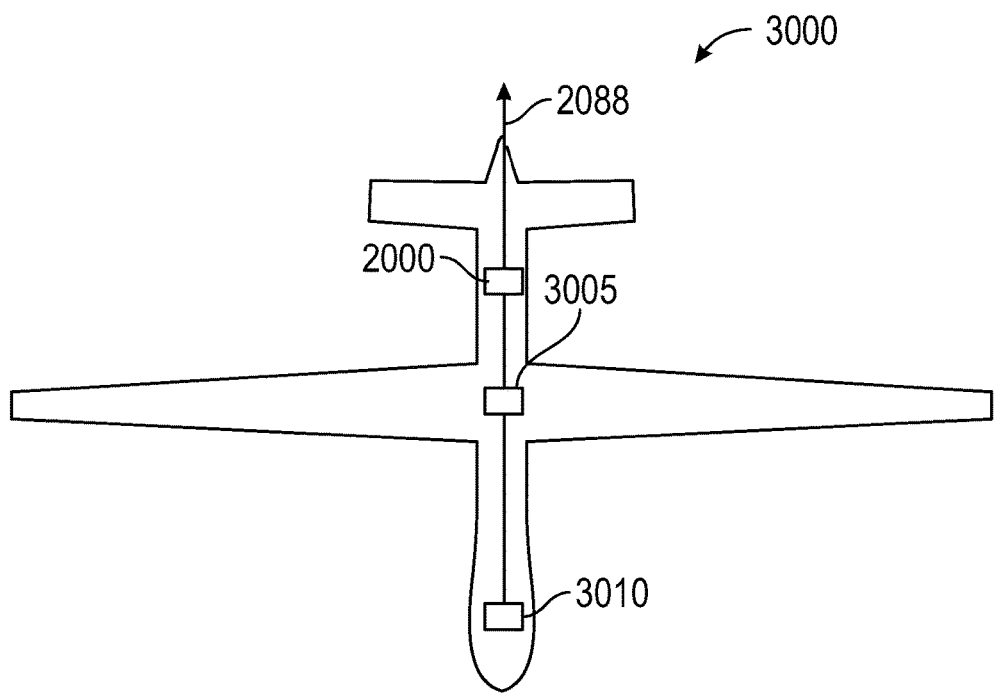
FIG. 11 illustrates a diagram of a vehicle system that can be partially powered and/or propelled by one or more of the integrated fuel cell and combustion systems of FIG. 10, according to one embodiment of the present disclosure.

FIG. 11 illustrates one embodiment of a vehicle system 3000 that can be at least partially powered and/or propelled by one or more of the integrated fuel cell and combustion systems 2000 shown in FIG. 10. The vehicle system 3000 optionally can be referred to as a vehicle. The vehicle system 3000 is shown as an aircraft (e.g., an unmanned aerial vehicle), but optionally may be a manned aircraft, a marine vessel, or a ground-based vehicle (e.g., an automobile, rail vehicle, mining vehicle, or the like). The vehicle system 3000 includes one or more of the integrated fuel cell and combustion systems 2000 that generate combustion 2088 to propel or assist in propelling the vehicle system 3000. For example, the combustion 2088 can provide thrust to the vehicle system 3000 to assist in moving the vehicle system 3000.

The vehicle system 3000 can include one or more powered systems 3005, 3010 that receive electric current generated by the integrated fuel cell and combustion system 2000 to perform work. For example, the powered systems 3005, 3010 may be loads that are at least partially powered by the current generated by fuel cells (e.g., fuel cell 206 of FIG. 3) of stacked fuel cell units (e.g., fuel cell units 100, 400, and/or 100') in the integrated fuel cell and combustion system 2000. Examples of the powered systems 3005, 3010 may be control circuitry that controls movement, thrust, throttle settings, movement directions, etc., of the vehicle system 3000, weapons of the vehicle system 3000, navigation systems, motors (e.g., rim motors), or the like. The powered systems 3005, 3010 can be conductively coupled with the system(s) 2000 to receive the electric current from fuel cells (e.g., fuel cell 206 of FIG. 3) of stacked fuel cell units (e.g., fuel cell units 100, 400, and/or 100').

Figure 12:
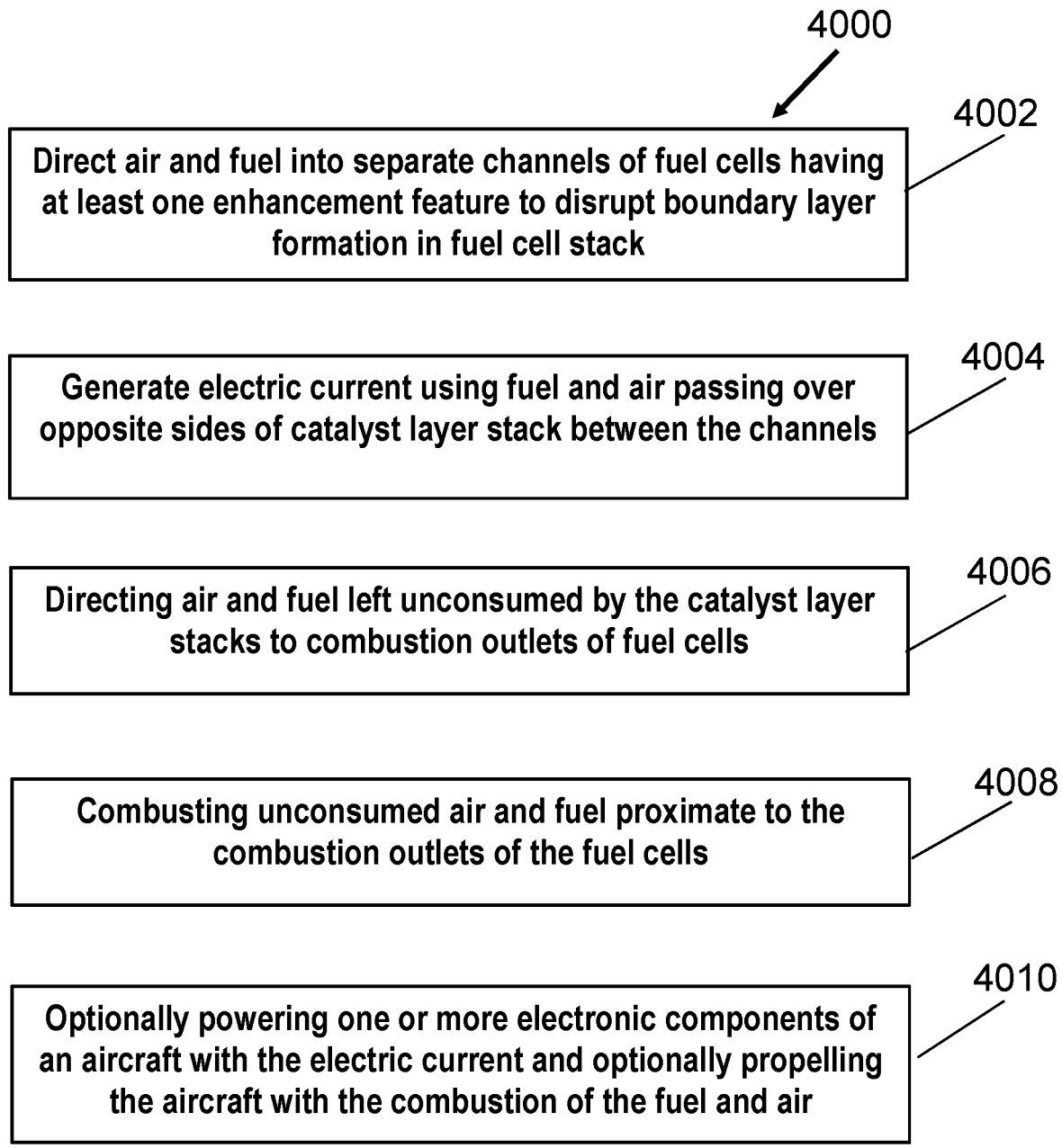
FIG. 12 illustrates a flowchart of one embodiment of a method for generating both electric energy and combustion from a fuel cell stack.

FIG. 12 illustrates a flowchart of one embodiment of a method 4000 for generating both electric energy and combustion from a fuel cell stack. The method 4000 can describe operation of one or more embodiments of the fuel cell units (100, 400, 100'), the fuel cells (see, e.g., fuel cell 206 of FIG. 3), and/or the integrated fuel cell and combustion systems 2000 described herein. The operations described in connection with the method 4000 can be automatically controlled by one or more processors, pumps, valves, motors, or the like, to automatically control the concurrent or simultaneous generation of electric current and combustion for propulsion by the fuel cells in the system 2000.

At 4002, air and fuel are directed into separate flow channels of fuel cell units (100, 400, 100') and/or fuel cells having at least one enhancement feature (as described above) to disrupt boundary layer formation in the fuel cell stack of the system (see, e.g., fuel cell 206 of FIG. 3). For example, oxygen can be directed into the air inlet 2060 of the outer housing 2010 of the system 2000 and gas can be directed into the fuel inlet 2050 of the outer housing 2010 of the system 2000. These inlets are separately connected with air channels and fuel channels in different fuel cells.

At 4004, electric current is generated using at least some of the fuel and the air passing over or otherwise contacting the catalyst layer stacks (or active layer membranes) in the fuel cells (see, e.g., active layer membrane 115 of FIGS. 1 and 2 and/or active layer membrane 415 of FIG. 5A). For example, the fuel channels may extend over one side of the catalyst layer stacks in each fuel cell and the air channels may extend over the opposite sides of the catalyst layer stacks in the same fuel cells. The fuel and air contact the cathode and anode layers, respectively, in the catalyst layer stack of each fuel cell to generate electric current (see, e.g., active layer membrane of FIGS. 1 and 2). This current can be conducted through the support structures of the fuel cells (see, e.g., support structure 110 of FIGS. 1 and 2 and/or support structure 410 of FIG. 5A) to one or more external loads.

At 4006, the air and fuel that is not consumed during the generation of electric current continues to flow through the elongated fuel and air channels. This air and fuel may remain separate in the fuel cells while the air and fuel flow toward the open ends of the air and fuel channels in the fuel cells.

At 4008, the air and fuel that is unconsumed during generation of the electric current and that flows to the open ends of the flow channels of the fuel cells are combusted. This combustion can occur just outside of the open ends of the channels, outside of the fuel cells. At 4010, optionally, the electric current generated by the fuel cells is used to power one or more loads, such as one or more electronic components of an aircraft. The combustion that is generated by the fuel cells can be used to propel the aircraft or assist in propelling the aircraft.

Although various dimensions are provided herein for the system 2000 and fuel cell units (100, 400, 100'), these dimensions can be varied as needed. For example, the dimensions of the components can be changed to increase combustion and/or electric current generation, to accommodate for continuing even flow of air and fuel in situations where an aircraft engine is decreasing or increasing thrust, or the like.

As discussed above, fuel cell performance can be limited due to boundary layers forming near the surface of the active layer membrane where reactions occur. In addition, pressurization has been found to be a power density enhancing factor for fuel cells. Thus, in accordance with the principles of the disclosure, various geometric shapes can be created via, for example, three-dimensional (3D) printing of fuel cell metal and/or ceramic support structures that are not generally possible with conventional manufacturing. Additionally, these support structures and/or enhancement features can be created in a single manufacturing process (e.g., 3D printing). Moreover, these geometric shapes have been found to yield superior performance, including, e.g., higher performance density.

For example, current machined metal supports have limited geometry and/or flexibility that can result in over-design and/or reduction in the power density of the fuel cell. However, in accordance with the principles of the disclosure, metal supports can be manufactured as needed with desired geometries, and a 2D/3D structure is expected to yield at least a 2× to 3× power density increase.

In addition, current fuel cells exhibit the formation of boundary layers near a surface of the active layer membrane where reactions occur, which causes reaction rates to decrease, particularly, at downstream locations. However, in accordance with the principles of the disclosure, enhancement features can be created and/or 3D printed into the flow field of the flow channels to swirl and/or disrupt such boundary layers by creating, for example, steps, trip wires, rotation features, fins, heat transfer augmentation dimples and/or valleys, and combinations thereof.

Moreover, a current problem with SOFCs (and similar fuel cells) is that such fuel cells are not optimized for pressurization. However, in accordance with the principles of the disclosure, novel 3D designs and/or structures can be created that can manage high pressures with minimal support, such that such 3D designs and/or structures can be made to hold pressure without adding much weight to the actual fuel cell structure.

Further, current SOFCs (and similar fuel cells) are generally assembled in a complex manner that includes lining up several manifolds. However, in accordance with the principles of the disclosure, 3D designs and/or structures can be created in a manner that allows for ease of assembly and/or new manifold geometries.

Thus, in accordance with the principles of the disclosure, flow channels can be created in geometries that promote boundary layer disruption, such as, e.g., zig-zag configurations, swirl geometries, internal 3D features, internal fins, herringbone flow disruption fins, boundary layer trip features, and/or other 3D geometries, via, for example, 3D printing using materials made out of various alloys, including, e.g., SS441 or other compatible SOFC alloys. In addition, such features, as well as support pillars, can be added to allow for pressurization of the SOFC. In accordance with the principles of the disclosure, these effects are anticipated to increase the power density by up to 5× (times). Such a 5× increase in the power density of such compact SOFCs would allow for these SOFCs to be commercialized at a reduced cost, smaller volumes (e.g., SOFCs that can fit in, for example, a jet engine), and a decreased weight.

Further aspects of the present disclosure are provided by the subject matter of the following clauses.

1. A fuel cell unit comprising: a support structure having a plurality of flow channels; and an active layer membrane coupled with the support structure, the active layer membrane comprising at least one electrode layer, wherein each flow channel of the plurality of flow channels is configured to direct one of air and fuel across at least one electrode layer of an active layer membrane to create electric current, and wherein each flow channel of the plurality of flow channels includes at least one enhancement feature that is configured to disrupt a formation of a boundary layer near a surface of the active layer membrane where reactions occur.

2. The fuel cell unit of any preceding clause, wherein the at least one electrode layer comprises a first electrode layer and a second electrode layer.

3. The fuel cell unit of any preceding clause, wherein the first electrode layer is an anode layer and the second electrode layer is a cathode layer.

4. The fuel cell unit of any preceding clause, wherein the active layer membrane further comprises a porous layer disposed between the support structure and the at least one electrode layer.

5. The fuel cell unit of any preceding clause, wherein the active layer membrane is deposited onto the support structure.

6. The fuel cell unit of any preceding clause, further comprising a bonding layer for bonding the active layer membrane to the support structure.

7. The fuel cell unit of any preceding clause, wherein the at least one enhancement feature comprises a webbing material attached to a surface of each flow channel of the plurality of flow channels, with the webbing material being configured to disrupt the formation of a boundary layer near a surface of the active layer membrane where reactions occur.

8. The fuel cell unit of any preceding clause, wherein the at least one enhancement feature comprises (i) a plurality of internal three-dimensional features, (ii) a plurality of internal fins, (iii) a plurality of herringbone flow disruption fins, (iv) a plurality of boundary layer trip features, and (v) combinations thereof.

9. The fuel cell unit of any preceding clause, wherein the plurality of internal three-dimensional features comprises one or more of (i) a plurality of internal bumps, (ii) a plurality of internal humps, and (iii) a helix shape.

10. The fuel cell unit of any preceding clause, further comprising a plurality of internal pillars positioned within each flow channel of the plurality of flow channels, wherein the plurality of internal pillars is configured to allow for pressurization of the fuel cell unit.

11. The fuel cell unit of any preceding clause, wherein the support structure includes a plate disposed between different groups of flow channels.

12. The fuel cell unit of any preceding clause, wherein a first group of the flow channels that direct a flow of air is located on one side of the plate and a second group of the flow channels that direct a flow of fuel is located on an opposite side of the plate.

13. The fuel cell unit of any preceding clause, wherein (i) a first group of flow channels of the plurality of flow channels that direct a flow of air is located on one side of the support structure and (ii) a second group of flow channels of the plurality of flow channels that direct a flow of fuel is located on an opposite side of the support structure.

14. The fuel cell unit of any preceding clause, wherein the first group of flow channels is arranged in a zig-zag configuration with the second group of flow channels.

15. The fuel cell unit of any preceding clause, wherein the zig-zag configuration creates a swirling channel that is configured to separate reacted and unreacted gases.

16. The fuel cell unit of any preceding clause, wherein the at least one enhancement feature is configured to be additively manufactured within each flow channel of the plurality of flow channels.

17. The fuel cell unit of any preceding clause, wherein the support structure is conductive.

18. The fuel cell unit of any preceding clause, wherein the active layer membrane comprises solid oxide.

19. The fuel cell unit of any preceding clause, wherein the support structure and the active layer membrane are shaped to be positioned onboard an aircraft with the support structure conductively coupled to one or more electronic loads of the aircraft such that at least some of the electric current created by the active layer membrane powers the one or more electronic loads.

20. The fuel cell unit of any preceding clause, wherein each flow channel of the plurality of flow channels extends to a combustion outlet, with the combustion outlets of the plurality of flow channels being oriented on the aircraft to propel the aircraft.

21. A fuel cell comprising a plurality of fuel cell units, with each fuel cell unit of the plurality of fuel cell units comprising: a support structure having a plurality of flow channels; and an active layer membrane coupled with the support structure, the active layer membrane comprising at least one electrode layer, wherein each flow channel of the plurality of flow channels is configured to direct one of air and fuel across at least one electrode layer of an active layer membrane to create electric current, and wherein each flow channel of the plurality of flow channels includes at least one enhancement feature that is configured to disrupt a formation of a boundary layer near a surface of the active layer membrane where reactions occur.

22. The fuel cell of any preceding clause, wherein an active layer membrane of a first fuel cell unit is disposed adjacent to a plurality of flow channels of a second fuel cell unit.

23. The fuel cell of any preceding clause, wherein the active layer membrane of each fuel cell unit comprises solid oxide.

24. The fuel cell of any preceding clause, wherein the support structure and the active layer membrane of each fuel cell unit are shaped to be positioned onboard an aircraft with the support structure conductively coupled to one or more electronic loads of the aircraft such that at least some of the electric current created by the active layer membrane of each fuel cell unit powers the one or more electronic loads.

25. The fuel cell of any preceding clause, wherein each flow channel of the plurality of flow channels of each fuel cell unit extends to a combustion outlet, with the combustion outlets of the plurality of flow channels being oriented on the aircraft to propel the aircraft.

26. A fuel cell unit comprising: a support structure having a plurality of flow channels, with (i) a first group of flow channels of the plurality of flow channels being configured to direct a flow of air located on one side of the support structure and (ii) a second group of flow channels of the plurality of flow channels being configured to direct a flow of fuel located on an opposite side of the support structure; and an active layer membrane coupled with the support structure, the active layer membrane comprising at least one electrode layer, wherein each flow channel of the plurality of flow channels is configured to direct one of air and fuel across at least one electrode layer of an active layer membrane to create electric current, and wherein the first group of flow channels is arranged in a zig-zag configuration with the second group of flow channels.

27. The fuel cell unit of any preceding clause, wherein the zig-zag configuration creates a swirling channel that is configured to separate reacted and unreacted gases.

28. The fuel cell unit of any preceding clause, wherein each flow channel of the plurality of flow channels includes at least one enhancement feature that is configured to disrupt a formation of a boundary layer near a surface of the active layer membrane where reactions occur.

29. The fuel cell unit of any preceding clause, wherein the at least one enhancement feature comprises a webbing material attached to a surface of each flow channel of the plurality of flow channels, with the webbing material being configured to disrupt the formation of a boundary layer near a surface of the active layer membrane where reactions occur.

30. The fuel cell unit of any preceding clause, wherein the at least one enhancement feature comprises (i) a plurality of internal three-dimensional features, (ii) a plurality of internal fins, (iii) a plurality of herringbone flow disruption fins, (iv) a plurality of boundary layer trip features, and (v) combinations thereof.

31. The fuel cell unit of any preceding clause, wherein the plurality of internal three-dimensional features comprises one or more of (i) a plurality of internal bumps, (ii) a plurality of internal humps, and (iii) a helix shape.

32. The fuel cell unit of any preceding clause, further comprising a plurality of internal pillars positioned within each flow channel of the plurality of flow channels, wherein the plurality of internal pillars is configured to allow for pressurization of the fuel cell unit.

33. A method comprising: directing fuel into fuel inlets of fuel cells in a fuel cell stack that extends from an inlet end to a combustion outlet end, the fuel inlets located proximate to the inlet end of the fuel cell stack; directing air into air inlets of the fuel cells, the air inlets located proximate to the inlet end of the fuel cell stack; creating electric energy by directing the air and the fuel across opposite sides of an active layer membrane that includes an anode layer, an electrolyte layer, and a cathode layer; directing at least some of the fuel and at least some of the air through flow channels of the fuel cells toward combustion outlets of the fuel cells that are proximate to the combustion outlet end of the fuel cell stack; and combusting the at least some fuel and the at least some air proximate the combustion outlet ends as an output combustion from the fuel cells, wherein one or more of the flow channels of the fuel cells includes at least one enhancement feature that is configured to disrupt a formation of a boundary layer near a surface of the active layer membrane where reactions occur.

34. The method of any preceding clause, further comprising one or more of: propelling a vehicle using the output combustion; or supplying the electric energy to one or more systems of the vehicle to power the one or more systems.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A fuel cell unit comprising:
a) a support structure having a plurality of flow channels; and
b) an active layer membrane coupled with the support structure, the active layer membrane comprising at least one electrode layer,
wherein each flow channel of the plurality of flow channels is configured to direct one of air and fuel across at least one electrode layer of an active layer membrane to create electric current; and
wherein each flow channel of the plurality of flow channels includes at least one enhancement feature formed in and extending from a surface of the flow channel that is configured to disrupt a formation of a boundary layer near a surface of the active layer membrane where reactions occur, wherein (i) a first group of flow channels of the plurality of flow channels that direct a flow of air is located on one side of the support structure and (ii) a second group of flow channels of the plurality of flow channels that direct a flow of fuel is located on an opposite side of the support structure, and wherein the first group of flow channels is arranged in a zig-zag configuration with the second group of flow channels.

2. The fuel cell unit of claim 1, wherein the at least one electrode layer comprises a first electrode layer and a second electrode layer.

3. The fuel cell unit of claim 1, wherein the active layer membrane further comprises a porous support layer disposed between the support structure and the at least one electrode layer.

4. The fuel cell unit of claim 1, wherein the at least one enhancement feature comprises a webbing material attached to a surface of each flow channel of the plurality of flow channels, with the webbing material being configured to disrupt the formation of a boundary layer near a surface of the active layer membrane where reactions occur.

5. The fuel cell unit of claim 1, wherein the at least one enhancement feature comprises one or more of (i) a plurality of internal three-dimensional features, (ii) a plurality of internal fins, (iii) a plurality of herringbone flow disruption fins, (iv) a plurality of boundary layer trip features, or (v) combinations thereof.

6. The fuel cell unit of claim 5, wherein the plurality of internal three-dimensional features comprises one or more of (i) a plurality of internal bumps, (ii) a plurality of internal humps, and (iii) a helix shape.

7. The fuel cell unit of claim 1, further comprising a plurality of internal pillars positioned within each flow channel of the plurality of flow channels, wherein the plurality of internal pillars is configured to allow for pressurization of the fuel cell unit.

8. The fuel cell unit of claim 1, wherein the support structure includes a plate disposed between different groups of flow channels.

9. The fuel cell unit of claim 8, wherein a first group of the flow channels that direct a flow of air is located on one side of the plate and a second group of the flow channels that direct a flow of fuel is located on an opposite side of the plate.

10. The fuel cell unit of claim 1, wherein the zig-zag configuration creates a swirling channel that is configured to separate reacted and unreacted gases.

11. The fuel cell unit of claim 1, wherein the at least one enhancement feature is configured to be additively manufactured within each flow channel of the plurality of flow channels.

12. The fuel cell unit of claim 1, wherein the active layer membrane comprises solid oxide.

13. The fuel cell unit of claim 1, wherein the support structure and the active layer membrane are shaped to be positioned onboard an aircraft with the support structure conductively coupled to one or more electronic loads of the aircraft such that at least some of the electric current created by the active layer membrane powers the one or more electronic loads.

14. The fuel cell unit of claim 13, wherein each flow channel of the plurality of flow channels extends to a combustion outlet, with the combustion outlets of the plurality of flow channels being oriented on the aircraft to propel the aircraft.

15. A fuel cell comprising a plurality of fuel cell units, with each fuel cell unit of the plurality of fuel cell units comprising:
   a) a support structure having a plurality of flow channels; and
   b) an active layer membrane coupled with the support structure, the active layer membrane comprising at least one electrode layer,
   wherein each flow channel of the plurality of flow channels is configured to direct one of air and fuel across at least one electrode layer of an active layer membrane to create electric current; and
   wherein each flow channel of the plurality of flow channels includes at least one enhancement feature formed in and extending from a surface of the flow channel that is configured to disrupt a formation of a boundary layer near a surface of the active layer membrane where reactions occur, wherein (i) a first group of flow channels of the plurality of flow channels that direct a flow of air is located on one side of the support structure and (ii) a second group of flow channels of the plurality of flow channels that direct a flow of fuel is located on an opposite side of the support structure, and wherein the first group of flow channels is arranged in a zig-zag configuration with the second group of flow channels.

16. The fuel cell of claim 15, wherein an active layer membrane of a first fuel cell unit is disposed adjacent to a plurality of flow channels of a second fuel cell unit.

17. A fuel cell unit comprising:
   a) a support structure having a plurality of flow channels, with (i) a first group of flow channels of the plurality of flow channels being configured to direct a flow of air located on one side of the support structure and (ii) a second group of flow channels of the plurality of flow channels being configured to direct a flow of fuel located on an opposite side of the support structure; and
   b) an active layer membrane coupled with the support structure, the active layer membrane comprising at least one electrode layer,
   wherein each flow channel of the plurality of flow channels is configured to direct one of air and fuel across at least one electrode layer of an active layer membrane to create electric current, and
   wherein the first group of flow channels is arranged in a zig-zag configuration with the second group of flow channels.

18. The fuel cell unit of claim 17, wherein the zig-zag configuration creates a swirling channel that is configured to separate reacted and unreacted gases.

* * * * *